US012646080B2

(12) United States Patent  
Choi et al.

(10) Patent No.: US 12,646,080 B2  
(45) Date of Patent: Jun. 2, 2026

(54) SYSTEM AND METHOD FOR GLOBAL REGULATORY COMPLIANCE DETERMINATION USING SMART CONTRACTS

(71) Applicant: OneCup Co., Ltd., Seongnam-si (KR)

(72) Inventors: Sojung Choi, Seongnam-si (KR); Seunghwan Lee, Seongnam-si (KR); Hanyeong Ko, Seongnam-si (KR); Taehyun Kang, Seongnam-si (KR); Sangbum Hur, Seongnam-si (KR)

(73) Assignee: OneCup Co., Ltd., Seongnam-si (KR)

( * ) Notice: Subject to any disclaimer, the term of this patent is extended or adjusted under 35 U.S.C. 154(b) by 0 days.

(21) Appl. No.: 18/958,432

(22) Filed: Nov. 25, 2024

(65) Prior Publication Data

US 2026/0141405 A1 May 21, 2026

(30) Foreign Application Priority Data

Nov. 20, 2024 (KR) ........................ 10-2024-0165756

(51) Int. Cl.
| | |
|---|---|
| *G06Q 30/02* | (2023.01) |
| *G06Q 30/018* | (2023.01) |
| *G06Q 50/18* | (2012.01) |

(52) U.S. Cl.
CPC ........... *G06Q 30/018* (2013.01); *G06Q 50/18* (2013.01)

(58) Field of Classification Search
CPC .............................. G06Q 30/018; G06Q 50/18
See application file for complete search history.

(56) References Cited

U.S. PATENT DOCUMENTS

2024/0202725 A1* 6/2024 Anapliotis ......... G06Q 30/0607

FOREIGN PATENT DOCUMENTS

| | | |
|---|---|---|
| JP | 2024-052438 A | 4/2024 |
| KR | 10-1877333 B1 | 8/2018 |
| KR | 10-2021-0050527 A | 5/2021 |
| KR | 10-2023-0136194 A | 9/2023 |

OTHER PUBLICATIONS

University of Chicago, "Too Many Metrics" (Year: 2016).*
An Office Action mailed by the Korean Ministry of Intellectual Property on Oct. 10, 2025, which corresponds to Korean Patent Application No. 10-2024-0165756 and is related to U.S. Appl. No. 18/958,432.

* cited by examiner

*Primary Examiner* — Breffni Baggot
(74) *Attorney, Agent, or Firm* — Studebaker Brackett PLLC

(57) ABSTRACT

Provided are a system and method for global regulatory compliance determination using smart contracts. According to various embodiments of the present disclosure, the system for global regulatory compliance determination using smart contracts includes a computing device that performs a global regulatory compliance determination procedure using the smart contracts, in which the computing device may issue an on-chain identification (ID) for a user and record the issued on-chain ID on on-chain, acquire information for determining whether the user complies with regulations, match the acquired information with the issued on-chain ID, and determine whether the user complies with regulations based on information matching the issued on-chain ID and regulatory information with which the user complies when verification of the user is required.

5 Claims, 6 Drawing Sheets

SYSTEM AND METHOD FOR GLOBAL REGULATORY COMPLIANCE DETERMINATION USING SMART CONTRACTS

CROSS-REFERENCE TO RELATED APPLICATION

This application claims priority to and the benefit of Korean Patent Application No. 10-2024-0165756, filed on Nov. 20, 2024, the disclosure of which is incorporated herein by reference in its entirety.

BACKGROUND

1. Field of the Invention

Various embodiments of the present disclosure relate to a system and method for global regulatory compliance determination using smart contracts.

2. Discussion of Related Art

This intellectual property was supported by '2024 Global Start-Up Supporting Program', through Gyeonggi Province.

A smart contract-based security token system is gradually spreading to ensure efficient transaction and security of digital assets. The smart contract-based security token system is configured to perform roles of multiple stakeholders, such as real asset owners, token issuers, asset managers and custodians, broker dealers, and investors. Each of these stakeholders is registered in a specific global registry through qualification verification and identity authentication. During the process, compliance requirements centered on regulations of the U.S. Securities and Exchange Commission (SEC) are confirmed through a Know Your Customer (KYC) procedure.

However, the current system is focused on the U.S. SEC regulations despite the fact that regulations in various countries may differ, and thus has limitations in simultaneously reflecting several regulatory requirements applied in multinational transactions. In other words, the lack of flexibility to simultaneously apply multiple regulatory standards may lead to challenges in regulatory compliance in international asset transactions.

The existing security token systems execute transactions based on the ERC-20 standard and do not have a built-in function to automatically comply with compliance rules. Therefore, a method of manually invoking a compliance module using a compliance rule pointer to check regulatory compliance is adopted. However, the method has the problem that the changed regulations are not immediately reflected because the function is not automated, despite the fact that the compliance module should be updated in a timely manner whenever laws or regulations change.

In addition, the current system lacks sufficient functionality to verify whether the correct compliance module is being called during transaction execution. This limits the ability to reliably evaluate the regulatory compliance of the transaction in real time, and may act as a factor that hinders the stability and reliability of the transaction.

Finally, the Ethereum network, where the ERC-20-based security token system operates, has transaction processing speed and scalability issues. In situations where large-scale transactions should be supported, processing delays or network overload may become a problem, which may negatively affect the efficiency and transaction speed of the entire system.

The background technology described above is something that the inventor possessed or has acquired in the process of deriving the content of the present disclosure, and it cannot necessarily be said to have been publicly disclosed prior to this application.

SUMMARY OF THE INVENTION

The present disclosure is directed to providing a system and method for global regulatory compliance determination using smart contracts capable of improving efficiency by issuing an on-chain identification (ID) for a user and recording the issued on-chain ID in on-chain, matching and adding various types of information for determining regulatory compliance to the on-chain ID, and determining whether a user complies with regulations based on the information recorded in the on-chain ID when verification of the user is required and checking whether the user complies with the regulations of various countries based on the on-chain ID.

In addition, the present disclosure is directed to providing a system and method for global regulatory compliance determination using smart contracts capable of reducing system maintenance costs while ensuring regulatory compliance by using proxy patterns to change logic of the smart contracts and flexibly responding to changes in regulations to continuously update the smart contracts in line with changes in new regulations or laws even after the smart contracts are deployed.

In addition, the present disclosure is directed to providing a system and method for global regulatory compliance determination using smart contacts capable of reducing security threats by continuously conducting transactions without service interruption while the smart contracts are upgraded by proxy design and allowing administrators to safely upgrade the smart contracts through their specific permissions.

In addition, the present disclosure is directed to providing a system and method for global regulatory compliance determination using smart contracts capable of allowing a decentralized validator to proactively validate transactions to greatly improve regulatory compliance and reliability and refusing transactions when there is no verified on-chain ID to prevent transactions that do not meet investor qualifications or regulatory requirements from being conducted.

In addition, the present disclosure is directed to providing a system and method for global regulatory compliance determination using smart contracts capable of applying a rollup method of processing multiple transactions on layer 2 and then compressing the results and recording the results on layer 1 to significantly improve transaction processing speed and network scalability, process more transactions, and improve both scalability and security while avoiding security issues on side chain bridges.

This result was produced as a '2024 Global Startup Business Support Project.'

The problems to be solved by the present disclosure are not limited to the above-described problems, and other problems that are not described may be obviously understood by those skilled in the art from the following description.

According to an aspect of the present invention, there is provided a system for global regulatory compliance determination using smart contracts including: a computing device that performs a global regulatory compliance determination procedure using the smart contracts, in which the computing device issues an on-chain identification (ID) for a user and records the issued on-chain ID on on-chain, acquires information for determining whether the user complies with regulations, matches the acquired information with the issued on-chain ID, and determines whether the user complies with regulations based on information matching the issued on-chain ID and regulatory information with which the user complies when verification of the user is required.

The computing device may store personal identification information (PII) of the user on a blockchain-based distributed database in off-chain when acquiring an on-chain ID issuance request including the PII of the user from an issuing authority, and issue an on-chain ID including a hash value of the stored PII to the user.

The acquired information may include the PII of the user, an identity verification result, and transaction information, and the computing device may evaluate a risk of the user based on the PII of the user, the identity verification result, and the transaction information, and store information on the evaluated risk by matching the information with the issued on-chain ID.

When the computing device acquires an identity verification result generated by the issuing authority performing an identity verification procedure for the user on the off-chain, the computing device may store the acquired identity verification result by matching the identity verification result with the issued on-chain ID.

When the computing device performs an identity verification procedure for the user based on the regulatory information that should be complied with in each of two or more different countries to acquire two or more identity verification results for each of the two or more countries, the computing device may match codes of the two or more countries with the two or more acquired identity verification results and individually add the results to the issued on-chain ID.

When the verification of the user is required, the computing device may call a compliance module through the smart contracts, and determine whether the user complies with the regulations based on the regulatory information on the regulations with which the user complies and the information matching the issued on-chain ID through the called compliance module.

The compliance module may include a plurality of regulatory layers each including different ranges of regulatory information, and the plurality of regulatory layers may have a hierarchical structure in which the plurality of regulatory layers are sequentially connected according to the regulatory range of the regulatory information, and when verification of a specific range is required for the user, the computing device may sequentially use regulatory information including at least one regulatory layer corresponding to the specific range or including the specific range among the plurality of regulatory layers to determine whether the user complies with the regulations.

When the verification of the user is required, the computing device may call a local contract of a pre-stored address through a proxy contract, and determine whether the user complies with the regulations based on the regulatory information of the regulations with which the user complies through the called local contract, and the computing device updates the local contract to determine whether the user complies with the regulations based on the updated regulatory information when the regulatory information is updated, and change the pre-stored address to an address of the updated local contract, and call the updated local contract through the proxy contract to re-determine whether the user complies with the regulations.

When a transaction is requested from the user, the computing device may call a validator through the smart contracts to determine whether the issued on-chain ID was issued by a request from a reliable issuing authority based on the information included in the issued on-chain ID and a list of pre-stored reliable issuing authorities, determine whether the user complies with the regulations based on the information included in the issued on-chain ID and the regulatory information with which the user complies, and approve the requested transaction only when it is determined that the issued on-chain ID is issued by the request from the reliable issuing authority and that the user complies with the regulations.

The computing device may process a transaction that issues the on-chain ID to multiple users for a predetermined period of time in a first blockchain network, and summarize a result of the processed transaction and record the summarized result on a second blockchain network.

According to another aspect of the present invention, there is provided a method of global regulatory compliance determination using smart contracts performed by a computing device included in a regulatory compliance determination system, including: issuing an on-chain ID for a user and recording the issued on-chain ID on on-chain; acquiring information for determining whether the user complies with regulations and matching the acquired information with the issued on-chain ID; and determining whether the user complies with regulations based on information matching the issued on-chain ID and regulatory information with which the user complies when verification of the user is required.

Other detailed content of the present disclosure is described in the detailed description and illustrated in the drawings.

BRIEF DESCRIPTION OF DRAWINGS

The following drawings attached to this specification illustrate preferred embodiments of the present disclosure, and serve to further understanding of the technical idea of the present disclosure along with the detailed description of the above-described invention. Therefore, the present disclosure should not be construed as limited to the matters shown in such drawings.

DETAILED DESCRIPTION OF EXEMPLARY EMBODIMENTS

Figure 1:
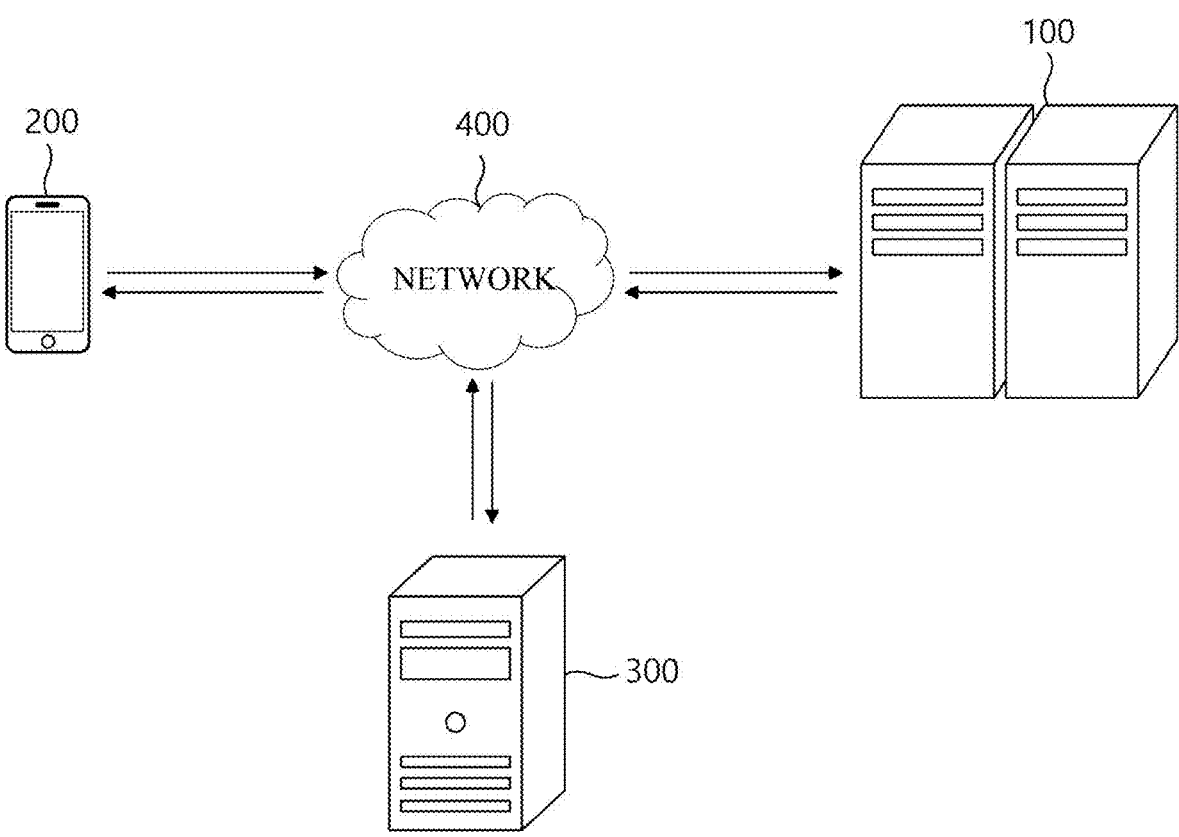
FIG. 1 is a diagram illustrating a system for global regulatory compliance determination using smart contracts according to an embodiment of the present disclosure.

Various advantages and features of the present disclosure and methods of accomplishing them will become apparent from the following description of embodiments with reference to the accompanying drawings. However, the present disclosure is not limited to embodiments to be described below, but may be implemented in various different forms, these embodiments will be provided only in order to make the present disclosure complete and allow those skilled in the art to completely recognize the scope of the present disclosure, and the present disclosure will be defined by the scope of the claims.

Terms used in the present specification are for explaining embodiments rather than limiting the present disclosure. Unless explicitly described to the contrary, a singular form includes a plural form in the present specification. The terms "comprise" and/or "comprising" used in the present disclosure do not exclude the existence or addition of one or more other components other than the mentioned components.

Like reference numerals refer to like components throughout the specification and "and/or" includes each of the components mentioned and all combinations thereof. The terms "first," "second" and the like are used to describe various components, but these components are not limited by these terms. These terms are used only in order to distinguish one component from other components. Therefore, it goes without saying that a first component mentioned below may be a second component within the technical scope of the present disclosure.

Further, as used herein, the term "unit" or "module" means a hardware component such as software, FPGA, or ASIC that performs predetermined functions. However, the term "unit" or "module" is not meant to be limited to software or hardware. A "unit" or "module" may be configured to be stored in a storage medium that can be addressed or may be configured to regenerate one or more processors. Accordingly, for example, the "unit" or "module" includes components such as software components, object-oriented software components, class components, and task components, processors, functions, attributes, procedures, subroutines, segments of a program code, drivers, firmware, a microcode, a circuit, data, a database, data structures, tables, arrays, and variables. Functions provided in components, "units," or "modules" may be combined into fewer components, "units," or "modules" or further separated into additional components, "units," or "modules."

Spatially relative terms "below," "beneath," "lower," "above," "upper," and the like, may be used in order to easily describe correlations between one component and other components. The spatially relative terms should be understood as terms including different directions of components during use or operation in addition to the directions illustrated in the drawings. For example, when a component illustrated in the drawings is turned over, another component described as "below" or "beneath" the component may be placed "above" the component. Accordingly, the illustrative term "below" may include both of a downward direction and an upward direction. Components may be oriented in other directions as well, and thus spatially relative terms may be interpreted according to orientations.

Unless the context dictates otherwise, as used herein, expressions such as "first," "second," "1$^{st}$," or "2nd" are used to distinguish one object from another when referring to a plurality of objects of the same type and do not limit the order or importance of the objects in question.

As used herein, the expressions "A, B, and C," "A, B, or C," "A, B, and/or C," "at least one of A, B, and C," "at least one of A, B, or C," "at least one of A, B, and/or C," "at least one selected from A, B, and C," "at least one selected from A, B, or C," "at least one selected from A, B, and/or C," etc., may mean each of the listed items or all possible combinations of the listed items. For example, "at least one selected from A and B" may refer to (1) A, (2) at least one of A, (3) B, (4) at least one of B, (5) at least one of A and at least one of B, (6) at least one of A and B, (7) at least one of B and A, (8) both A and B.

The expression "based on" is used herein to describe one or more factors affecting the decision, act of judgment, or action described in the phrase or sentence containing the expression, and this expression does not exclude additional factors influencing the decision, or act or action of judgment.

As used herein, the expression "a component (e.g., a first component) is 'connected' or 'coupled' to another component (e.g., a second component)" may mean that the component is not only directly connected or coupled to the other component, but also that it is connected or coupled to the other component via another component (e.g., a third component).

As used herein, the expression "configured to" may mean "set to," "having the ability to," "modified to," "made to," "capable of," etc., according to the context. The corresponding expression is not limited to the meaning of "specifically designed in hardware." For example, a processor configured to perform a specific operation may be a generic-purpose processor that can perform the specific operation by executing software.

Unless defined otherwise, all terms (including technical and scientific terms) used in the present specification have the same meanings commonly understood by those skilled in the art to which the present disclosure pertains. In addition, terms defined in generally used dictionaries are not ideally or excessively interpreted unless they are specifically defined clearly.

In this specification, a computer is any kind of hardware device including at least one processor, and can be understood as including a software configuration which is operated in the corresponding hardware device according to the embodiment. For example, the meaning of "computer" may be understood to include all of smart phones, tablet PCs, desktops, laptops, and user clients and applications running on each device, but is not limited thereto.

Hereinafter, embodiments of the present disclosure will be described in detail with reference to the accompanying drawings.

Each step described in this specification is described as being performed by the computer, but subjects of each step are not limited thereto, and according to embodiments, at least some steps can also be performed on different devices.

FIG. 1 is a diagram illustrating a system for global regulatory compliance determination using smart contracts according to an embodiment of the present disclosure.

Referring to FIG. 1, a system for global regulatory compliance determination using smart contracts according to an embodiment of the present disclosure may include a computing device 100, a user terminal 200, an external server 300, and a network 400.

Here, the system for global regulatory compliance determination using smart contracts illustrated in FIG. 1 is according to an embodiment, and components of the system are not limited to the embodiment illustrated in FIG. 1, and may be added, changed, or deleted as necessary.

In an embodiment, the computing device 100 may perform a process of determining global regulatory compliance using smart contracts.

In various embodiments, the computing device 100 may issue an on-chain identification (ID) for a user, record the issued on-chain ID on on-chain, and store information for determining whether the user complies with regulations by matching the information with the on-chain ID.

In addition, the computing device 100 may determine whether the user complies with regulations based on the regulatory information related to the regulations with which the user should comply and the information matched with the on-chain ID of the user.

Here, the computing device 100 may be a server operating under an issuing authority that issues the on-chain ID, verifies a user's identity, and determines whether the user complies with regulations based on the on-chain ID upon an external request, but is not limited thereto, and may be an external server that performs an operation of issuing the on-chain ID, an operation of verifying the user's identity, and an operation of determining whether the user complies with regulations upon the request from the issuing authority.

In various embodiments, the computing device 100 may be connected to the user terminal 200 via the network 400, and provide a global regulatory compliance determination service using smart contracts to the user terminal 200.

Here, the user terminal 200 is a user terminal that is an issuance target of the on-chain ID, and may be any type of entity (entities) in a system having a mechanism for communicating with the computing device 100. For example, the user terminal 200 may include a personal computer (PC), a notebook, a mobile terminal, a smart phone, a tablet personal computer (tablet PC), a wearable device, etc., and may include all types of terminals that may access wired/wireless networks. In addition, the user terminal 200 may include any computing device implemented by at least one of an agent, an application programming interface (API), and a plug-in. In addition, the user terminal 200 may include an application source and/or a client application.

In addition, here, the network 400 may be a connection structure capable of exchanging information between respective nodes such as a plurality of terminals and servers. For example, the network 400 may include a local area network (LAN), a wide area network (WAN), the Internet (World Wide Web (WWW)), a wired/wireless data communication network, a telephone network, a wired/wireless television communication network, a controller area network (CAN), Ethernet, or the like.

Examples of the wireless data communication network may include 3G, 4G, 5G, 3rd Generation Partnership Project (3GPP), 5th Generation Partnership Project (5GPP), Long Term Evolution (LTE), World Interoperability for Microwave Access (WiMAX), Wi-Fi, the Internet, a local area network (LAN), a wireless local area network (WLAN), a wide area network (WAN), a personal area network (PAN), radio frequency, a Bluetooth network, a near-field communication (NFC) network, a satellite broadcast network, an analog broadcast network, a digital multimedia broadcasting (DMB) network, and the like, but are not limited thereto.

In an embodiment, the external server 300 may be connected to the computing device 100 via the network 400, and may store and manage various types of information/data required for the computing device 100 to perform the method of global regulatory compliance determination using smart contracts, or may collect, store, and manage various types of information/data derived by performing the method of global regulatory compliance determination using smart contracts. For example, the external server 300 may be a storage server provided outside the computing device 100, but is not limited thereto. Hereinafter, a hardware configuration of the computing device 100 performing the method of global regulatory compliance determination using smart contracts will be described with reference to FIG. 2.

Figure 2:
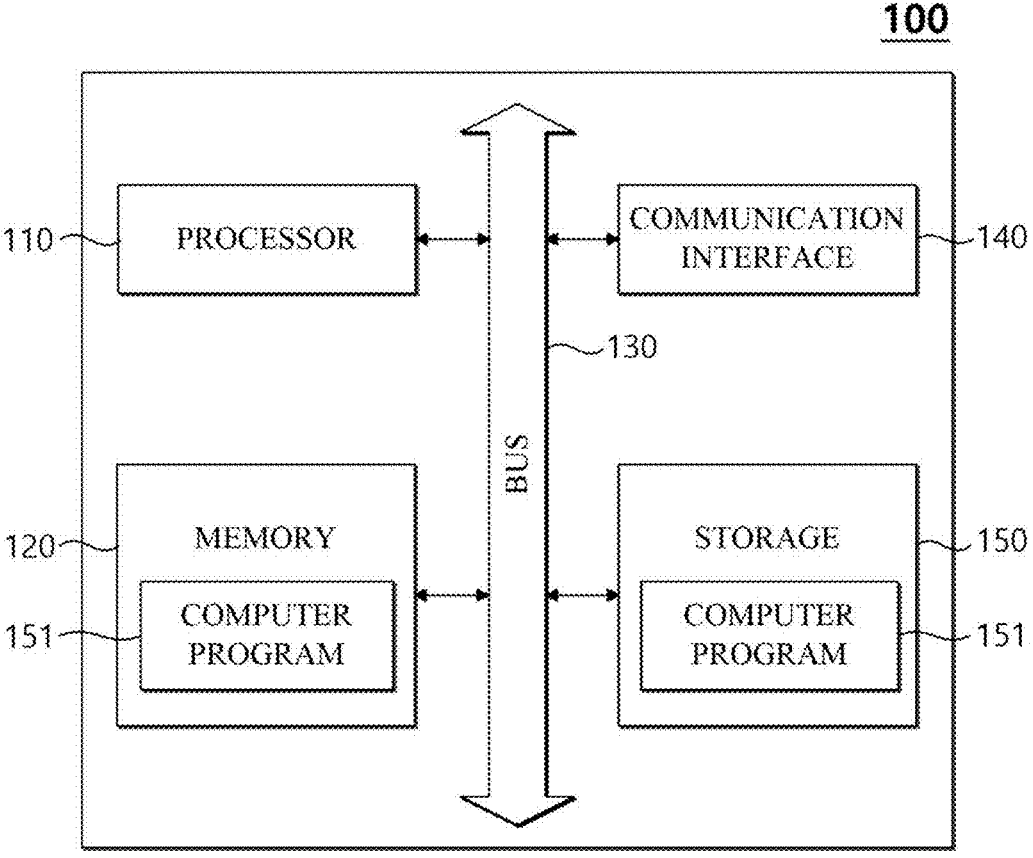
FIG. 2 is a diagram illustrating a hardware configuration of a computing device according to another embodiment of the present disclosure.

FIG. 2 is a diagram illustrating a hardware configuration of a computing device according to another embodiment of the present disclosure.

Referring to FIG. 2, the computing device 100 according to another embodiment of the present disclosure may include one or more processors 110, a memory 120 that loads a computer program 151 executed by the processor 110, a bus 130, a communication interface 140, and a storage 150 that stores the computer program 151. Here, only the components related to the embodiment of the present disclosure are illustrated in FIG. 2. Accordingly, one of ordinary skill in the art to which the present disclosure pertains may know that the computing device 210 may further include other general-purpose components in addition to the components illustrated in FIG. 2.

The processor 110 controls an overall operation of each component of the computing device 100. The processor 110 may be configured to include a central processing unit (CPU), a micro processor unit (MPU), a micro controller unit (MCU), a graphics processing unit (GPU), or any type of processor well known in the art of the present disclosure.

In addition, the processor 110 may perform an operation on at least one application or program for executing the method according to the embodiments of the present disclosure, and the computing device 100 may include one or more processors.

In various embodiments, the processor 110 may further include a random access memory (RAM) (not illustrated) and a read-only memory (ROM) (not illustrated) for temporarily and/or permanently storing signals (or data) processed in the processor 110. In addition, the processor 110 may be implemented in the form of a system-on-chip (SoC) including at least one of a GPU, a RAM, and a ROM.

The memory 120 stores various data, commands, and/or information. The memory 120 may load the computer program 150 from the storage 151 to execute methods/operations according to various embodiments of the present disclosure. When the computer program 151 is loaded into the memory 120, the processor 110 may perform the method/operation by executing one or more instructions constituting the computer program 151. The memory 120 may be implemented as a volatile memory such as a random access memory (RAM), but the technical scope of the present disclosure is not limited thereto.

The bus 130 provides a communication function between the components of the computing device 100. The bus 130 may be implemented as various types of buses, such as an address bus, a data bus, and a control bus.

The communication interface 140 supports wired/wireless Internet communication of the computing device 100. In addition, the communication interface 140 may support various communication manners other than the Internet communication. To this end, the communication interface 140 may be configured to include a communication module well known in the art to which the present disclosure pertains. In some embodiments, the communication interface 140 may be omitted.

The storage 150 may non-temporarily store the computer program 151. When the computing device 100 performs the process of determining global regulatory compliance using smart contracts, the storage 150 may store various types of information necessary to provide the process of determining global regulatory compliance using smart contracts.

The storage 150 may include a nonvolatile memory, such as a ROM, an erasable programmable ROM (EPROM), an electrically erasable programmable ROM (EEPROM), and a flash memory, a hard disk, a removable disk, or any well-known computer-readable recording medium in the art to which the present disclosure pertains.

The computer program 151 may include one or more instructions to cause the processor 110 to perform methods/operations according to various embodiments of the present disclosure when loaded into the memory 120. That is, the processor 110 may perform the method/operation according to various embodiments of the present disclosure by executing the one or more instructions.

In an embodiment, the computer program 151 may include one or more instructions for performing a method of global regulatory compliance determination using smart contracts, including issuing an on-chain ID for a user who is an issuance target upon a request from an issuing authority server and recording the issued on-chain ID on on-chain, acquiring information for determining whether a user complies with regulations and matching the acquired information with the issued on-chain ID, and determining whether the user complies with the regulations based on the information matching the issued on-chain ID and the regulatory information with which the user should comply when verification of the user is requested from a verification authority server.

Operations of the method or algorithm described with reference to the embodiment of the present disclosure may be directly implemented in hardware, in software modules executed by hardware, or in a combination thereof. The software module may reside in a RAM, a ROM, an EPROM, an EEPROM, a flash memory, a hard disk, a removable disk, a compact disc read-only memory (CD-ROM), or in any form of computer-readable recording media known in the art to which the preset disclosure pertains.

The components of the present disclosure may be embodied as a program (or application) and stored in media for execution in combination with a computer which is hardware. The components of the present disclosure may be executed in software programming or software elements, and similarly, embodiments may be realized in a programming or scripting language such as C, C++, Java, and assembler, including various algorithms implemented in a combination of data structures, processes, routines, or other programming constructs. Functional aspects may be implemented in algorithms executed on one or more processors. Hereinafter, the method of global regulatory compliance determination using smart contracts performed by the computing device 100 will be described in more detail with reference to FIGS. 3 to 6.

Figure 3:
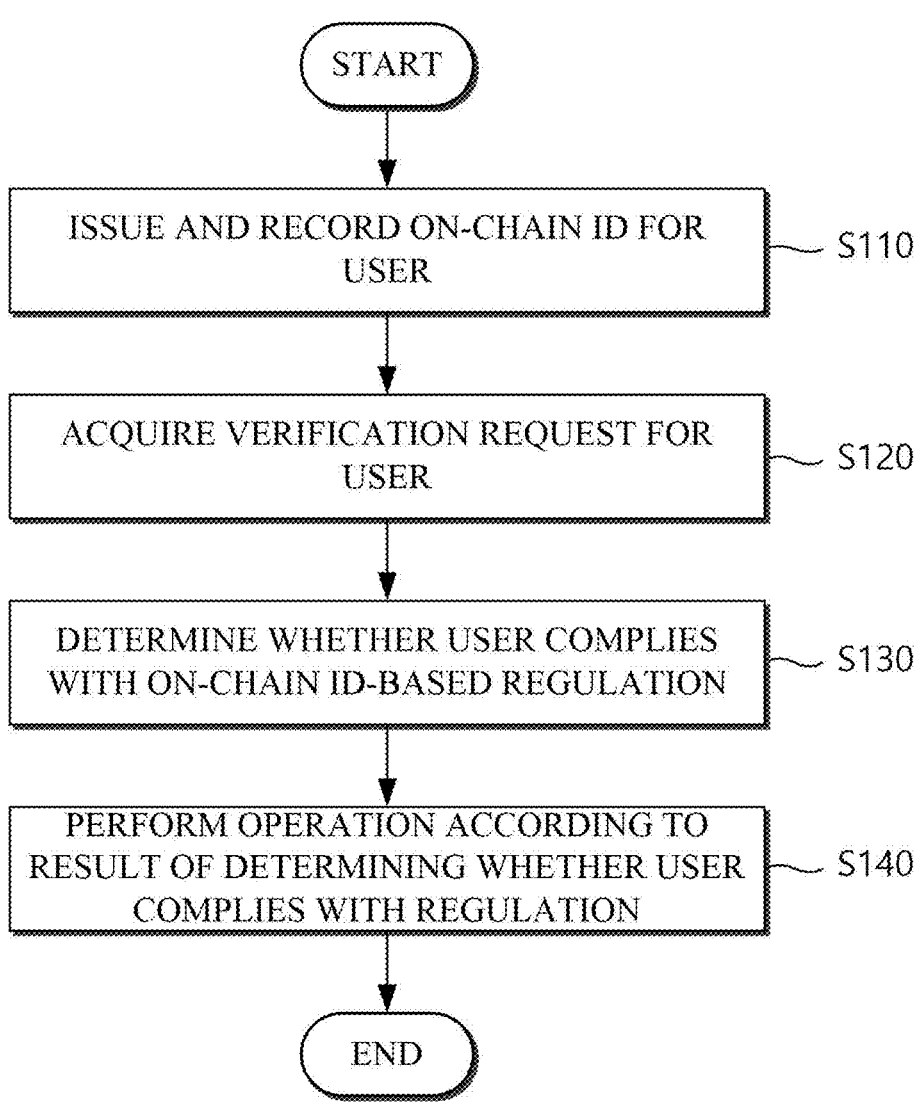
FIG. 3 is a flowchart of a method of global regulatory compliance determination using smart contracts according to another embodiment of the present disclosure.
Figure 4:
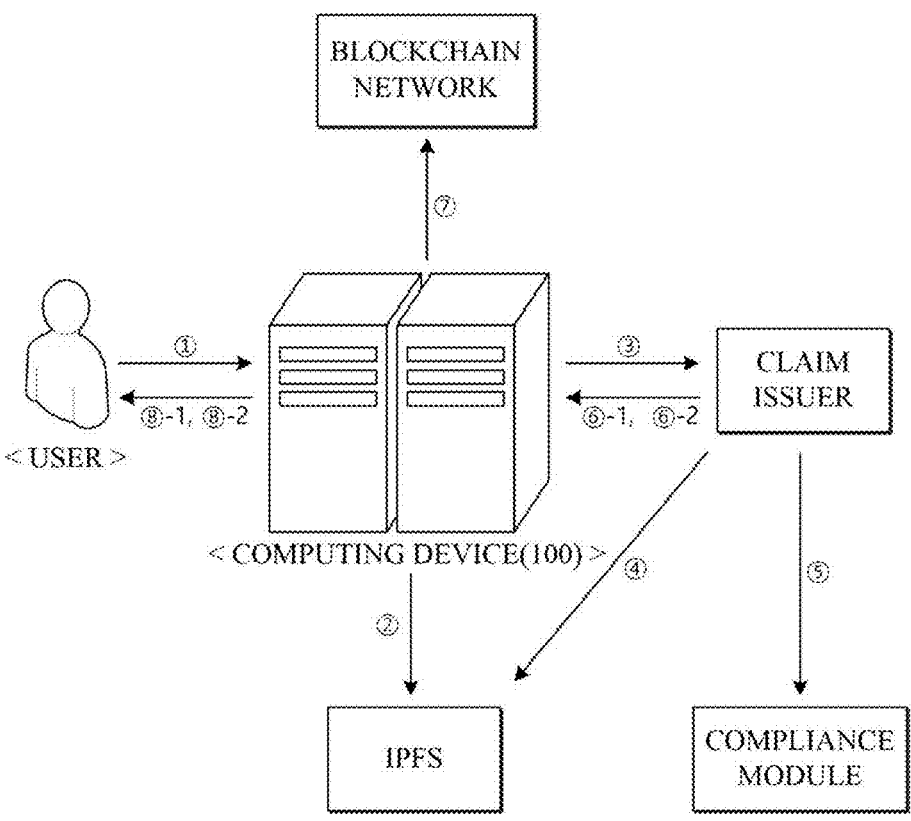
FIG. 4 is a diagram illustrating a process of issuing an on-chain identification (ID) according to various embodiments of the present disclosure.

FIG. 3 is a flowchart of a method of global regulatory compliance determination using smart contracts according to another embodiment of the present disclosure, and FIG. 4 is a diagram illustrating a process of issuing an on-chain ID according to various embodiments of the present disclosure.

Referring to FIGS. 3 and 4, in operation S110, the computing device 100 may issue and record the on-chain ID for the user.

More specifically, referring to FIG. 4, first, the computing device 100 may acquire an on-chain ID issuance request including the user's personal identification information (PII) of the user (or issuing agency) who is the issuance target (①).

Thereafter, the computing device 100 may store the PII of the user on an off-chain blockchain-based distributed database (e.g., InterPlanetary File System (IPFS)) (②).

Thereafter, the computing device 100 may transmit an on-chain ID issuance request including a hash value of a location where the PII is stored in the blockchain-based distributed database to an on-chain ID claim issuer (③).

Thereafter, the on-chain ID claim issuer may verify the PII stored on the blockchain-based distributed database through the hash value received from the computing device 100 (④), and perform Know Your Customer (KYC) after mapping a hierarchical compliance module based on the PII verified in the blockchain-based distributed database (⑤).

Thereafter, the on-chain ID claim issuer may issue the on-chain ID when the KYC succeeds (⑥-1), and the computing device 100 may register the issued on-chain ID in the blockchain network (⑦) and notify the user of the issued on-chain ID (⑧-1).

Meanwhile, the on-chain ID claim issuer may transmit the failure result and the rejection reason to the computing device 100 when the KYC fails (⑥-2), and the computing device 100 may transmit the failure result and the rejection reason to the user (⑧-2). That is, the computing device 100 may correct the integrity of the PII by recording only the hash value of the PII stored in the blockchain-based distributed database, not the PII of the user itself, on the on-chain.

In various embodiments, when the computing device 100 acquires information for determining whether a user complies with regulations, the computing device 100 may store the acquired information by matching the acquired information with the on-chain ID.

For example, when acquiring an identity verification result for a user, the computing device 100 may store the identity verification result by matching the identity verification result with the on-chain ID.

Here, the identity verification result is generated when the issuing authority performs an identity verification procedure for a user on the off-chain. For example, the identity verification procedure may be a Know Your Customer (KYC) result derived by performing the KYC, but is not limited thereto.

In this case, when the computing device 100 performs the identity verification procedure for the user based on the regulatory information that should be complied with in each of two or more different countries to acquire two or more identity verification results for each of the two or more countries, the computing device may match codes of the two or more countries with the two or more acquired identity verification results and individually add the results to the on-chain ID. For example, the computing device 100 may match an identity verification result in the United States with the country code 1 of the United States and add the result to the on-chain ID, and match an identity verification result in Korea with the country code 82 of Korea and add the result to the on-chain ID.

That is, instead of issuing a country-specific on-chain ID based on the identity verification results in each country, the computing device 100 may add/manage the identity verification results of each country by matching the identity verification results with a single on-chain ID.

As another example, when the computing device 100 acquires the PII of the user, the identity verification result, and transaction information (e.g., transaction history, transaction pattern, etc.), the computing device 100 may evaluate the user's risk level (e.g., high risk group, medium risk group, low risk group, etc.) based on the PII of the user, the identity verification results, and the transaction information, and store information on the risk level by matching the information with the on-chain ID.

In operation S120, the computing device 100 may acquire the verification request for the user after the on-chain ID for the user is issued and recorded through operation S110.

Here, the verification request for the user is a request to verify whether the user complies with the regulations. For example, the verification request may be acquired in response to a user request for a specific transaction or generation of a transaction, but is not limited thereto, and the user requesting the specific transaction or the generation of the transaction itself may be recognized as the verification request for the user.

In operation S130, the computing device 100 may determine whether the user complies with the regulations based on the on-chain ID of the user in response to the verification request for the user acquired through operation S120.

In various embodiments, when the verification of the user is requested, the computing device 100 may determine whether the user complies with the regulations based on the information matching the on-chain ID and the regulatory information with which the user should comply.

In various embodiments, when the verification of the user is required, the computing device 100 may call the compliance module through the smart contracts, and determine whether the user complies with the regulations based on the regulatory information on the regulations with which the user should comply and the information matching the on-chain ID through the called compliance module.

Here, the compliance module may be a specific function or sub-module of the smart contracts for determining whether the user complies with the regulations. That is, the compliance module may be a module that serves to confirm regulatory requirements within the smart contracts and review whether the user complies with the regulations, but is not limited thereto.

In various embodiments, the compliance module may include a plurality of regulatory layers each including different ranges of regulatory information. The plurality of regulatory layers may have a hierarchical structure in which the regulatory layers are sequentially connected according to the regulatory range of the regulatory information, and when the verification is required for the user in a specific range, the computing device 100 may sequentially use the regulatory information that corresponds to the specific range among the plurality of regulatory layers or includes at least one regulatory layer that includes the specific range to determine whether the user complies with the regulations.

Figure 5:
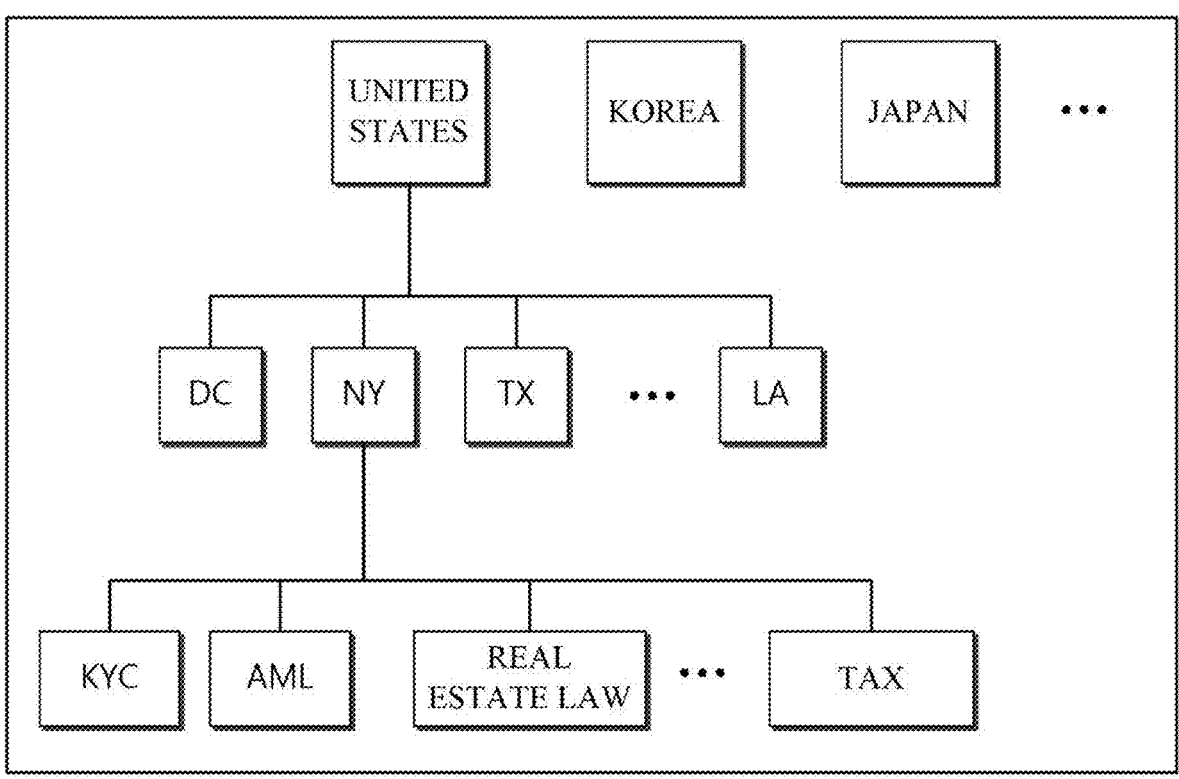
FIG. 5 is a diagram exemplarily illustrating a compliance module including a plurality of regulatory layers having a hierarchical structure applicable to various embodiments.

For example, when the computing device 100 determines whether a user complies with regulations in New York when the compliance module has a hierarchical structure by country, state, and type of law as illustrated in FIG. 5, the computing device 100 may sequentially use the regulatory information included in the regulatory layer corresponding to New York among the plurality of regulatory layers and the regulatory information included in the regulatory layer corresponding to the United States where New York is located to determine whether the user complies with the regulations in New York and whether the user complies with the regulations in the United States.

In various embodiments, the computing device 100 may use a proxy design to determine whether the user complies with the regulations.

Generally, when the regulations change, such content should be updated. However, when the smart contracts are deployed once, there is a problem that the smart contracts cannot be modified. To solve this problem, the computing device 100 may use the proxy design to determine whether the user complies with the regulations, thereby flexibly responding to the change in regulations.

More specifically, first, when the verification of the user is required, the computing device 100 may call a local contract of a pre-stored address through a proxy contract, and determine whether the user complies with the regulations based on the regulatory information on the regulations with which the user should comply through the local contract.

In this case, when the regulatory information is updated, the computing device 100 may update the local contract to determine whether the user complies with the regulations based on the updated regulatory information, and change the pre-stored address in the proxy contract to the address of the updated local contract.

Thereafter, the computing device 100 may call the local contract of the changed address (updated local contract) through the proxy contract, and re-determine whether the user complies with the regulations through the updated local contract.

Here, the proxy contract is a contract that users interact with, and is a contract that stores the address of the logic contract and delegates a call through delegatecall.

In addition, the local contract is a contract in which actual functions and logic are implemented, and may be a contract that can be replaced with a new version if necessary.

Here, the address change of the proxy contract may be implemented to be performed only by an administrator with the right to change the address or by an authorized entity through the contract access control, but is not limited thereto.

In operation S140, the computing device 100 may perform the operation according to whether the user complies with the regulations determined through operation S130.

For example, upon determining that the identity verification result of the user exists and that the user complies with the regulations, the computing device 100 may approve the transaction corresponding to the transaction requested by the user.

Meanwhile, upon determining that the identity verification result of the user does not exists and that the user does not comply with the regulations, the computing device 100 may reject the transaction corresponding to the transaction requested by the user.

In this case, when the transaction corresponding to the transaction requested by the user is rejected, the computing device 100 may generate and transmit an error message describing the reason for the failure of the transaction.

In various embodiments, the computing device 100 may perform verification for transaction execution.

Figure 6:
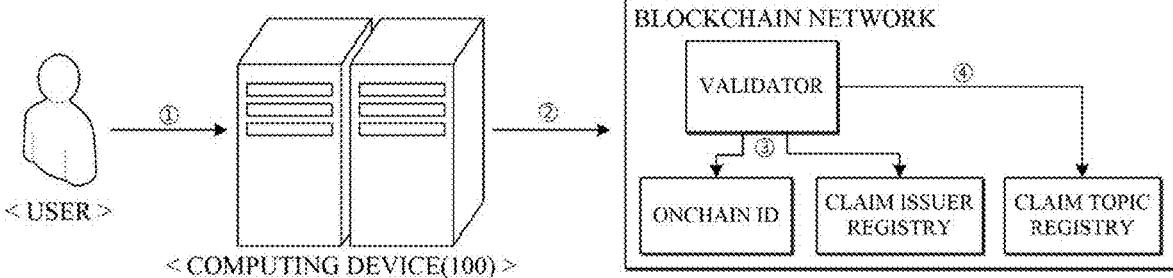
FIG. 6 is a diagram illustrating a verification process for performing a transaction in various embodiments.

More specifically, referring to FIG. 6, the computing device 100 may acquire a transaction request from the user (①).

Thereafter, the computing device 100 may call a validator through smart contracts and transmit the transaction content requested by the user to the validator (②).

Thereafter, the validator may verify the validity of the on-chain ID based on the contents received from the computing device 100 (③). For example, the computing device 100 may verify whether the on-chain ID is issued by an institution in a list of trustworthy issuers in the on-chain ID claim issuer registry, whether the period is valid, etc. However, the present invention is not limited thereto.

Thereafter, when the on-chain ID is determined to be valid, the validator may determine whether the transaction requested by the user is valid based on the on-chain ID (④). For example, when the transaction requested by the user is a transaction that instructs a purchase of a specific token, the computing device 100 may verify whether the transaction contains contents on whether the token purchase is possible based on the user's on-chain ID through the Claim Topic Registry, and perform the verification for the transaction execution on whether the transaction contains the contents.

In various embodiments, the computing device 100 may solve the scalability using the Layer 2 chain.

More specifically, the computing device 100 may process a transaction that issues an on-chain ID for a plurality of users for a predetermined period of time in the first blockchain network (layer 1), summarize the results of the transactions processed in the first blockchain network, and record the summarized results on the second blockchain network (layer 2).

The method of global regulatory compliance determination using smart contracts has been described above with reference to the flowchart illustrated in the drawings. For a simple description, the method of global regulatory compliance determination using smart contracts has been described by showing a series of blocks, but the present disclosure is not limited to the order of the blocks, and some blocks may be performed in an order different from that shown and performed in the present specification, or may be performed concurrently. In addition, new blocks not described in the present specification and drawings may be added, or some blocks may be deleted or changed.

According to the present disclosure, by issuing the on-chain identification (ID) for the user and recording the issued on-chain ID in the on-chain, matching and adding various types of information for determining regulatory compliance to the on-chain ID, and determining whether the user complies with the regulations based on the information recorded in the on-chain ID when the verification of the user is required and checking whether the user complies with the regulations of various countries based on the on-chain ID, it is possible to improve efficiency.

In addition, by using proxy patterns to change the logic of the smart contracts and flexibly responding to changes in regulations to continuously update the smart contracts in line with changes in new regulations or laws even after the smart contracts are deployed, it is possible to reduce system maintenance costs while ensuring regulatory compliance.

In addition, by continuously conducting transactions without service interruption while the smart contracts are upgraded by the proxy design and allowing administrators to safely upgrade the smart contracts through their specific permissions, it is possible to reduce security threats.

In addition, by allowing the decentralized validator to proactively validate transactions, it is possible to greatly improve regulatory compliance and reliability, and by refusing transactions when there is no verified on-chain ID, it is possible to prevent transactions that do not meet investor qualifications or regulatory requirements from being conducted.

In addition, by applying the rollup method of processing multiple transactions on the layer 2 and then compressing the results and recording the results on the layer 1, it is possible to significantly improve transaction processing speed and network scalability, process more transactions, and improve both the scalability and security while avoiding security issues on side chain bridges.

The effects of the present disclosure are not limited to the above-described effects, and other effects that are not mentioned may be obviously understood by those skilled in the art from the following description.

Although exemplary embodiments of the present disclosure have been described with reference to the accompanying drawings, those skilled in the art to which the present disclosure belongs will appreciate that various modifications and alterations may be made without departing from the spirit or essential features of the present disclosure. Therefore, it is to be understood that the exemplary embodiments described hereinabove are illustrative rather than being restrictive in all aspects.

What is claimed is:

1. A system for global regulatory compliance determination using smart contracts, comprising:

a computing device that performs a global regulatory compliance determination procedure using the smart contracts, wherein the computing device issues an on-chain identification (ID) for a user and records the issued on-chain ID on on-chain, acquires information for determining whether the user complies with regulations and matches the acquired information with the issued on-chain ID, and when verification of the user is required, determines whether the user complies with regulations based on information matching the issued on-chain ID and regulatory information with which the user complies, wherein the computing device stores personal identification information (PII) of the user on a blockchain-based distributed database in off-chain when acquiring an on-chain ID issuance request including the PII of the user from an issuing authority, and issues an on-chain ID including a hash value of the stored PII to the user, wherein the acquired information includes the PII of the user, an identity verification result, and transaction information, wherein the computing device evaluates a risk of the user based on the PII of the user, the identity verification result, and the transaction information, and stores information on the evaluated risk by matching the information with the issued on-chain ID, wherein, when the computing device performs an identity verification procedure for the user based on the regulatory information that should be complied with in each of two or more different countries to acquire two or more identity verification results for each of the two or more countries, the computing device may match codes of the two or more countries with the two or more acquired identity verification results and individually add the results to the issued on-chain ID, wherein, when the verification of the user is required, the computing device calls a compliance module through the smart contracts, and determines whether the user complies with the regulations based on the regulatory information on the regulations with which the user complies and the information matching the issued on-chain ID through the called compliance module, wherein the compliance module includes a plurality of regulatory layers each including different ranges of regulatory information, and the plurality of regulatory layers have a hierarchical structure in which the plurality of regulatory layers are sequentially connected according to the regulatory range of the regulatory information, wherein, when verification of a specific range is required for the user, the computing device sequentially uses regulatory information including at least one regulatory layer corresponding to the specific range or including the specific range among the plurality of regulatory layers to determine whether the user complies with the regulations, wherein, when the verification of the user is required, the computing device calls a local contract of a pre-stored address through a proxy contract, and determines whether the user complies with the regulations based on the regulatory information of the regulations with which the user complies through the called local contract, and wherein, when the regulatory information is updated, updates the local contract to determine whether the user complies with the regulations based on the updated regulatory information, changes the pre-stored address to an address of the updated local contract, and calls the updated local contract through the proxy contract to re-determine whether the user complies with the regulations.

2. The system of claim 1, wherein, when the computing device acquires an identity verification result generated by the issuing authority performing an identity verification procedure for the user on the off-chain, the computing device stores the acquired identity verification result by matching the identity verification result with the issued on-chain ID.

3. The system of claim 1, wherein, when a transaction is requested from the user, the computing device calls a validator through the smart contracts to determine whether the issued on-chain ID was issued by a request from a reliable issuing authority based on the information included in the issued on-chain ID and a list of pre-stored reliable issuing authorities, determines whether the user complies with the regulations based on the information included in the issued on-chain ID and the regulatory information with which the user complies, and approves the requested transaction only when it is determined that the issued on-chain ID is issued by the request from the reliable issuing authority and that the user complies with the regulations.

4. The system of claim 1, wherein the computing device processes a transaction that issues the on-chain ID to multiple users for a predetermined period of time in a first blockchain network, and summarizes a result of the processed transaction and records the summarized result on a second blockchain network.

5. A method of global regulatory compliance determination using smart contracts performed by a computing device included in a regulatory compliance determination system, the method comprising:

issuing an on-chain ID for a user and recording the issued on-chain ID on on-chain;

acquiring information for determining whether the user complies with regulations and matching the acquired information with the issued on-chain ID; and determining whether the user complies with regulations based on information matching the issued on-chain ID and regulatory information with which the user complies when verification of the user is required, wherein the computing device stores personal identification information (PII) of the user on a blockchain-based distributed database in off-chain when acquiring an on-chain ID issuance request including the PII of the user from an issuing authority, and issues an on-chain ID including a hash value of the stored PII to the user, wherein the acquired information includes the PII of the user, an identity verification result, and transaction information, wherein the computing device evaluates a risk of the user based on the PII of the user, the identity verification result, and the transaction information, and stores information on the evaluated risk by matching the information with the issued on-chain ID, wherein, when the computing device performs an identity verification procedure for the user based on the regulatory information that should be complied with in each of two or more different countries to acquire two or more identity verification results for each of the two or more countries, the computing device may match codes of the two or more countries with the two or more acquired identity verification results and individually add the results to the issued on-chain ID, wherein, when the verification of the user is required, the computing device calls a compliance module through the smart contracts, and determines whether the user complies with the regulations based on the regulatory information on the regulations with which the user complies and the information matching the issued on-chain ID through the called compliance module, wherein the compliance module includes a plurality of regulatory layers each including different ranges of regulatory information, and the plurality of regulatory layers have a hierarchical structure in which the plurality of regulatory layers are sequentially connected according to the regulatory range of the regulatory information, wherein, when verification of a specific range is required for the user, the computing device sequentially uses regulatory information including at least one regulatory layer corresponding to the specific range or including the specific range among the plurality of regulatory layers to determine whether the user complies with the regulations, wherein, when the verification of the user is required, the computing device calls a local contract of a pre-stored address through a proxy contract, and determines whether the user complies with the regulations based on the regulatory information of the regulations with which the user complies through the called local contract, and wherein, when the regulatory information is updated, updates the local contract to determine whether the user complies with the regulations based on the updated regulatory information, changes the pre-stored address to an address of the updated local contract, and calls the updated local contract through the proxy contract to re-determine whether the user complies with the regulations.

* * * * *